(12) United States Patent
Ishii

(10) Patent No.: US 8,503,417 B2
(45) Date of Patent: Aug. 6, 2013

(54) WIRELESS LAN DEVICE AND PROTOCOL EXECUTION METHOD

(75) Inventor: Hideki Ishii, Nagoya (JP)

(73) Assignee: Buffalo Inc., Nagoya-shi (JP)

( * ) Notice: Subject to any disclaimer, the term of this patent is extended or adjusted under 35 U.S.C. 154(b) by 316 days.

(21) Appl. No.: 13/013,769

(22) Filed: Jan. 25, 2011

(65) Prior Publication Data
US 2011/0222517 A1   Sep. 15, 2011

(30) Foreign Application Priority Data

Mar. 15, 2010   (JP) .................................. 2010-057684

(51) Int. Cl.
*H04W 4/00* (2009.01)
(52) U.S. Cl.
USPC ............................. 370/338; 370/315; 370/328
(58) Field of Classification Search
USPC .......................................... 370/328, 338, 315
See application file for complete search history.

(56) References Cited

U.S. PATENT DOCUMENTS

| | | | |
|---|---|---|---|
| 6,870,822 B2 * | 3/2005 | Balogh | 370/332 |
| 7,359,363 B2 * | 4/2008 | Sakai | 370/338 |
| 2006/0018481 A1 * | 1/2006 | Nagano et al. | 380/270 |
| 2009/0092060 A1 * | 4/2009 | Goto | 370/254 |
| 2010/0067406 A1 * | 3/2010 | Suzuki | 370/254 |
| 2010/0195595 A1 * | 8/2010 | Iwata | 370/329 |
| 2011/0216692 A1 * | 9/2011 | Lundsgaard et al. | 370/328 |

FOREIGN PATENT DOCUMENTS

| | | |
|---|---|---|
| JP | 2005-142907 A | 6/2005 |
| JP | 2006-050372 A | 2/2006 |
| JP | 2009-303170 A | 12/2009 |
| WO | WO-2005-034434 A1 | 4/2005 |
| WO | WO-2005-109764 A1 | 11/2005 |

* cited by examiner

*Primary Examiner* — Kenny Lin
(74) *Attorney, Agent, or Firm* — Oblon, Spivak, McClelland, Maier & Neustadt, L.L.P.

(57) ABSTRACT

A wireless LAN device for performing wireless communication with another wireless device in a wireless communication system is disclosed. The wireless LAN device includes first and second communication sections which participate in a configuration process using a predetermined protocol. An execution section executes, based on an instruction received at a reception section, the configuration process by use of one of the first and second communication sections in cooperation with the another wireless device. An exclusion section performs, before the configuration process is completed, an exclusion process that excludes the other of the first and second communication sections from continuing to participate in the configuration process.

9 Claims, 6 Drawing Sheets

WIRELESS LAN DEVICE AND PROTOCOL EXECUTION METHOD

CROSS REFERENCE TO RELATED APPLICATION

The disclosure of Japanese Patent Application No. 2010-057684 filed on Mar. 15, 2010 is incorporated herein by reference.

BACKGROUND OF THE INVENTION

1. Field of the Invention

The present invention relates to a wireless LAN device that performs wireless communication in a wireless network.

2. Description of the Background Art

In a wireless LAN (Local Area Network), the communication range is limited by the coverage area of the wireless LAN devices in the network. In order to remove such limitation, a technology called WDS (Wireless Distribution System) has been developed. In this system, when it is desired to perform communication over a wide area exceeding the coverage area of a wireless LAN device, a plurality of wireless LAN devices serving as access points are installed to wirelessly relay a packet between the access points. Meanwhile, a wireless LAN device compliant with the WDS is developed, which functions as a station to be connected to another access point, and as an access point that relays communication between stations connected to the wireless LAN device (refer to, for example, Japanese Laid-Open Patent Publication No. 2009-303170). As described above, a wireless LAN device having a function of an access point and a function of a station can relay communication between another access point and a plurality of stations.

In such a wireless LAN device having both the function of an access and the function of a station, a process using a predetermined protocol is performed in order to establish a connection with another wireless LAN device. For example, using a protocol compliant with AOSS (trademark, AirStation One-Touch Secure System), WPS (Wi-Fi Protected Setup), or the like, automatic configuration of wireless connection information for encryption, authentication, or the like of network equipment may be performed. For example, Japanese Laid-Open Patent Publication No. 2005-142907 discloses a process of configuring encryption information, which is performed between an access point and a station. However, when both an access point and a station are included in a wireless LAN device, a process using a protocol may be executed between the access point and the station in the wireless LAN device, which may cause a problem in that the information of the wireless LAN device may be configured in the device's own access point or station. One way to avoid such a problem is to specify which one of the access-point-side configuration process and the station-side configuration process should be performed. However, this has been found to cause complicated operation and/or a complicated device construction. Therefore, there has been a problem in that it has been difficult to realize configuration of the access point or the station by using a common trigger (for example, push-down of a button). Such a problem occurs not only when a wireless LAN device has the function of an access point and the function of a station but also when a wireless LAN device has both the function of one of two units performing a process using a protocol and the function of the other unit.

SUMMARY OF THE INVENTION

An object of the present invention is to provide a wireless LAN device having both the function of one of two units performing a process using a protocol and the function of the other unit, and to realize the process between the wireless LAN device and another wireless LAN device by using a simple device construction and/or simple operation. The present invention solves one or more of the above-mentioned problems, and can be realized by the following embodiments or application examples.

A first aspect of the present invention is directed to a wireless LAN device for performing wireless communication with another wireless device in a wireless communication system, the wireless LAN device including: a nontransitory information recording medium encoded with a program containing a first communication section, a second communication section, a reception section, an execution section, and an exclusion section, executable by a processor; wherein the first communication section, when executed by the processor, performs wireless communication as a first functioning unit configured to participate in a configuration process using a predetermined protocol; the second communication section, when executed by the processor, performs wireless communication as a second functioning unit configured to participate in the configuration process; the reception section, when executed by the processor, receives an instruction to execute the configuration process; the execution section, when executed by the processor, executes, based on the instruction, the configuration process by use of one of the first and second-communication sections in cooperation with the another wireless device; and the exclusion section, when executed by the processor, performs, before the configuration process is completed, an exclusion process that excludes the other of the first and second communication sections from continuing to participate in the configuration process.

In a further aspect, the exclusion section may restrict wireless communication between the first and second communication sections, based on identification information of at least one of the first and second communication sections, thereby performing the exclusion process.

In a further aspect, the configuration process includes a process for configuring security information from the one unit to the other unit by the wireless communication, the security information relating to the wireless communication and being used by the two units.

In a further aspect, the wireless LAN device may include an information section for informing which one of the first and second communication sections executes the configuration process.

In a further aspect, the wireless LAN device may include a stoppage section for stopping the operation of the first or second communication section which is excluded by the exclusion section, at least until the configuration process is completed.

In a further aspect, the configuration operation includes AOSS operations.

In a further aspect, the protocol includes an access-point/station protocol, and the first functioning unit includes an access point and the second functioning unit includes a station.

A second aspect of the present invention is directed to a method to be executed in a wireless LAN device, for example, the above-described wireless LAN device, and to a storage medium having stored therein a program to be executed in the wireless LAN device.

A third aspect of the present invention is a wireless communication system, comprising the wireless LAN device of the first aspect, and the another wireless LAN device.

According to one or more aspects of the present invention, it is possible to realize a process, between a wireless LAN device having both a function of one of two units participating the process and a function of the other unit, and another wireless LAN device, by a simple device construction and/or a simple operation.

The present invention is applicable to, for example, a wireless LAN device performing wireless communication in a wireless network. These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, preferred embodiments of the present invention will be described.

Embodiment 1

Figure 1:
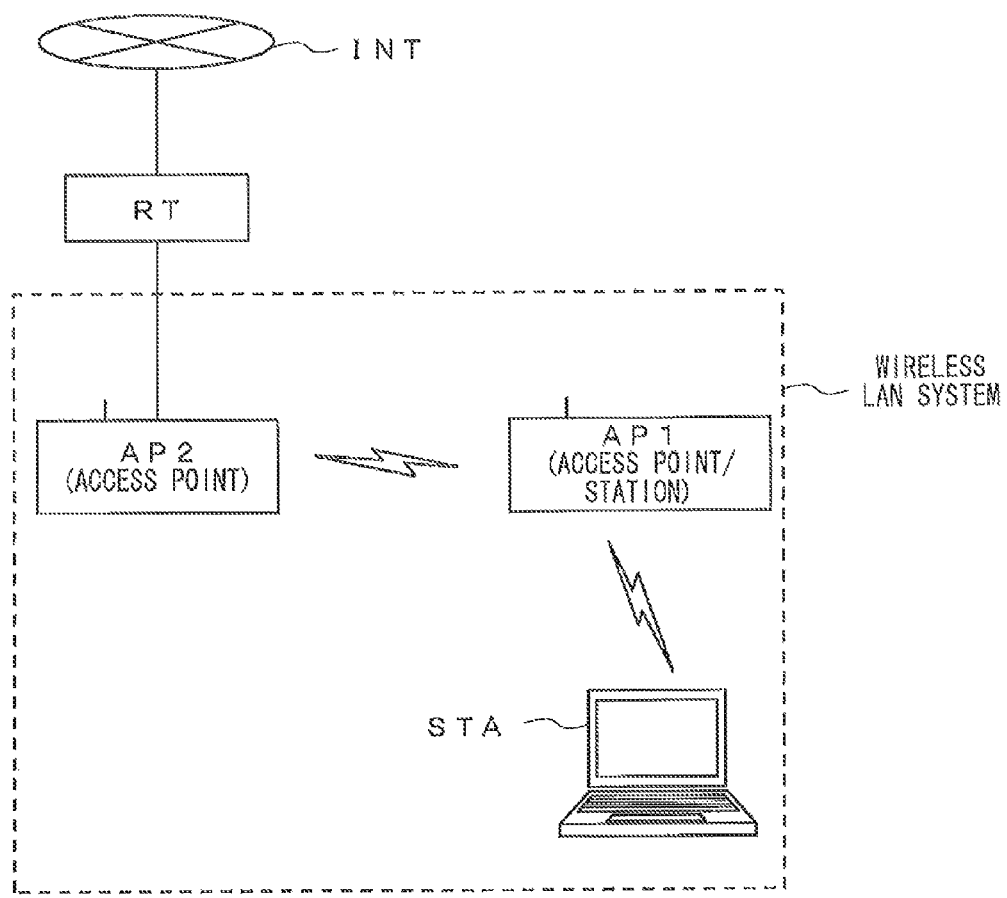
FIG. 1 is a schematic diagram illustrating a wireless LAN system according to Embodiment 1 and Embodiment 2 of the present invention.

First, a wireless LAN device AP1 as a wireless LAN device according to Embodiment 1 will be described. FIG. 1 is a diagram illustrating a schematic configuration of a wireless LAN system 20 incorporating use of the wireless LAN device AP1. In this embodiment, the wireless LAN system 20 includes the wireless LAN device AP1, an access point AP2, and a station STA. The wireless LAN system 20 is compliant with the IEEE 802.11 standards. The wireless LAN device AP1 has an access point function and a station function. The access point AP2 has an access point function and a bridge function for connecting a wired LAN to a wireless LAN. The access point AP2 is connected to the Internet INT via a router RT which is wire-connected to the access point AP2. The access point function of each of the wireless LAN device AP1 and the access point AP2 includes a WDS (Wireless Distribution System) function for wirelessly relaying a packet between the wireless LAN device AP1 and the access point AP2. The wireless LAN device AP1 and the access point AP2 are located in a radio coverage area, and are capable of performing wireless communication with each other based on the WDS.

The station STA is a general-purpose personal computer equipped with a wireless LAN card, or a wireless LAN module embedded therein. The station STA can perform wireless communication in an infrastructure mode with the wireless LAN device AP1. The station STA can access the Internet INT via the wireless LAN device AP1 and the access point AP2. The above-described network construction is merely an example, and the network can be configured in any desired manner. For example, a plurality of stations STA may be wirelessly connected to the wireless LAN device AP1. One or more stations STA may be wirelessly connected to the access point AP2.

Figure 2:
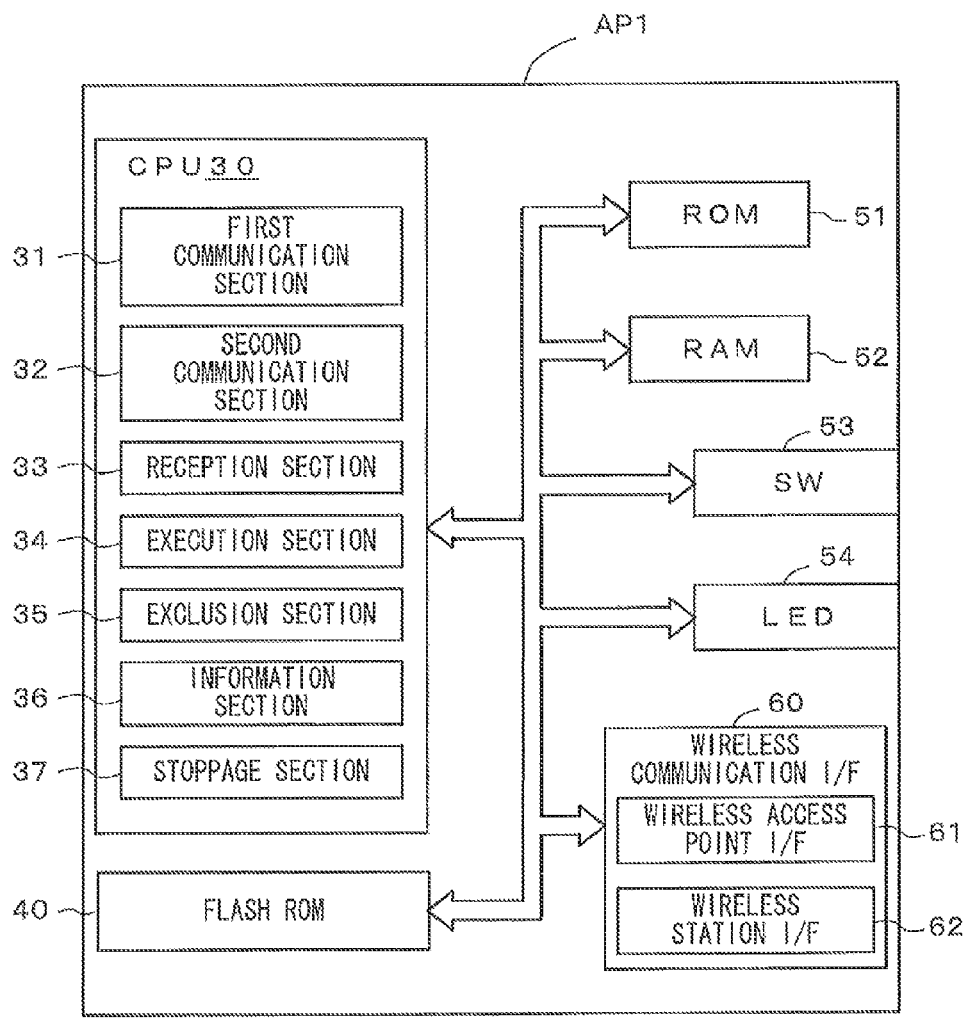
FIG. 2 is a configuration diagram illustrating a wireless LAN device according to Embodiment 1 and Embodiment 2 of the present invention.

FIG. 2 illustrates an exemplary schematic configuration of the wireless LAN device AP1. With reference to FIG. 2, the wireless LAN device AP1 includes a CPU 30, a flash ROM 40, a ROM 51, a RAM 52, a switch 53, an LED 54, and a wireless communication interface 60. These elements are interconnected via a bus, as shown.

The CPU 30 is a processor for controlling the overall operation of the wireless LAN device AP1. Specifically, the CPU 30 reads a preliminarily stored program such as firmware stored in the flash ROM 40 or the ROM 51, which are non-transitory media, and copies the program in the RAM 52 to thereby execute the program. Alternatively, the program may be provided in any suitable non-transitory or transitory media, for example. The program may be stored in another medium such as a CD-ROM, and the CPU 30 may read the program from the medium. In accordance with the program, the CPU 30 functions as a first communication section 31, a second communication section 32, a reception section 33, an execution section 34, an exclusion section 35, an information section 36, and a stoppage section 37. The execution section 34 includes an AOSS function. These functional sections will be described in detail later.

The switch 53 is a manually-operable switch which provides an instruction to start an AOSS operation for automatically configuring security information relating to wireless communication. The switch 53 is not restricted thereto, and any suitable switch may be used as an interface for automatically configuring wireless connection information for performing wireless connection. For example, in the case where the CPU 30 utilizes a WPS function, a WPS switch may be used.

The LED 54 indicates the operating state of the wireless LAN device AP1 during an AOSS operation. Specifically, the LED 54 indicates whether the wireless LAN device AP1 performs the AOSS operation as an access point or as a station. In Embodiment 1, the LED 54 causes a display section to light up with either of two predetermined colors, according to the operating state of the wireless LAN device AP1 during the AOSS operation. However, the construction of the LED 54 is not restricted thereto. The LED 54 may indicate the operating state of the wireless LAN device AP1 by causing any one or more of a plurality of display sections to light up. A light-emitting device such as an LED is not necessarily used, and other types of indicators may be used. The operating state of the wireless LAN device AP1 during the AOSS operation may be indicated by displaying the same on a monitor or the like, or may be indicated by audio output, for example.

The wireless communication interface 60 is an interface for performing wireless communication, and includes a wireless access point interface 61 and a wireless station interface 62. The wireless access point interface 61 functions as an access point, and wirelessly relays a packet transmitted from a station. The wireless station interface 62 functions as a station, and wirelessly relays a packet with an access point. In Embodiment 1, the wireless access point interface 61 and the wireless station interface 62 are constructed as a wireless module, and Virtually function as two logical devices. The wireless access point interface 61 and the wireless station interface 62 are assigned logical MAC addresses that are different from each other. Hereinafter, the MAC address assigned to the wireless access point interface 61 is also referred to as MAC1, and the MAC address assigned to the wireless station interface 62 is also referred to as MAC2. As will be appreciated, the wireless access point interface 61 and the wireless station interface 62 may be constructed as two modules physically separated from each other. In Embodiment 1, the wireless access point interface 61 and the wireless station interface 62 both use a frequency band of 2.4 GHz. However, the present invention is not restricted thereto. The wireless access point interface 61 and the wireless station interface 62 may use a frequency band of 5 GHz, for example. Alternatively, one of the wireless access point interface 61 and the wireless station interface 62 may use a frequency band of 2.4 GHz, while the other may use a frequency band of 5 GHz.

The access point AP2, a schematic construction of which is not shown, is a general-purpose access point having an AOSS function. The access point AP2 includes an AOSS switch, which is, for example, similar to that of the wireless LAN device AP1. The station STA, a schematic construction of which is not shown, is equipped with a wireless LAN card, or a wireless LAN module embedded therein. The wireless LAN card or module has an AOSS function. An instruction to start an AOSS operation can be given to the station STA via an application of a personal computer.

Figure 3:
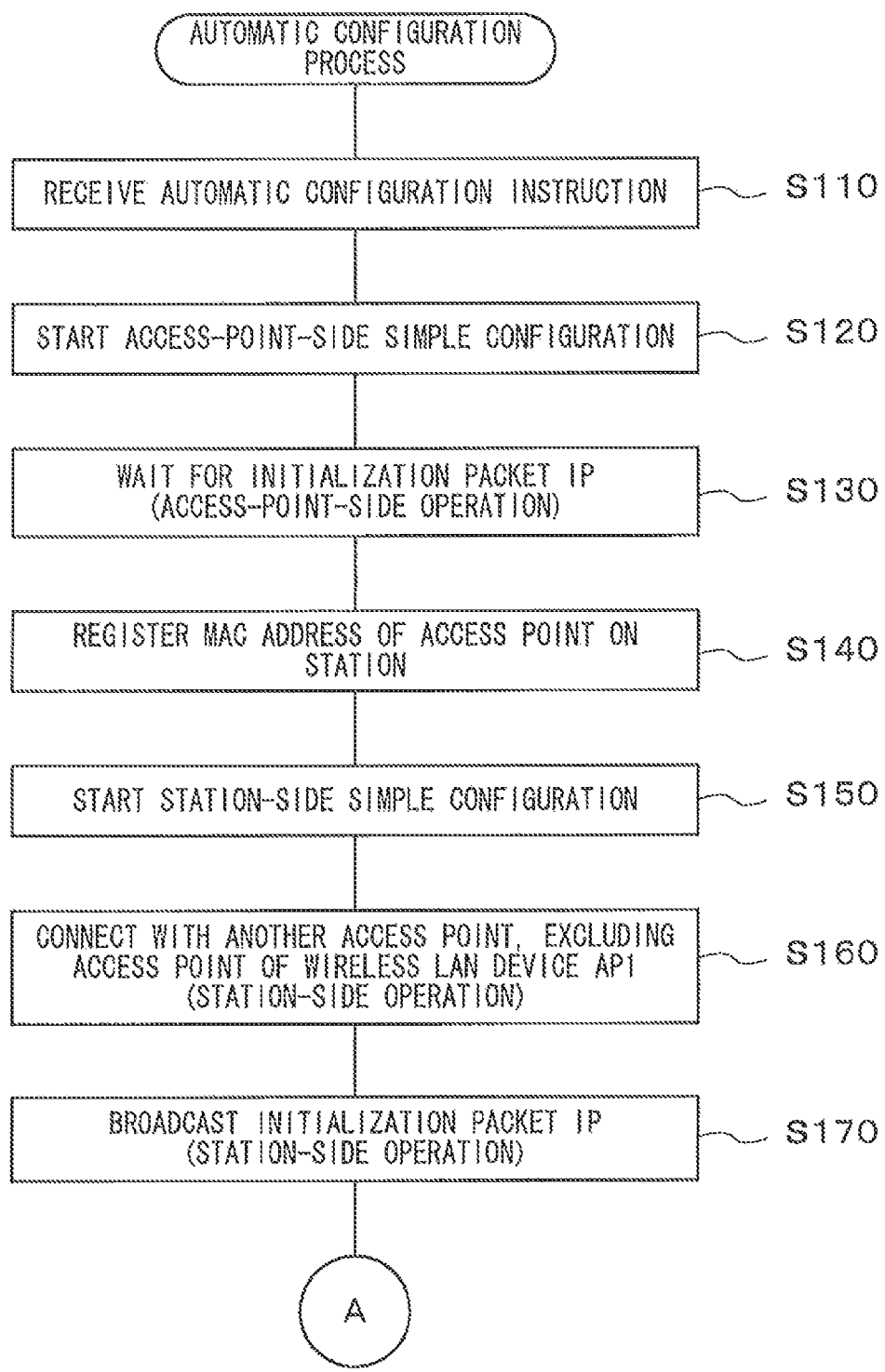
FIG. 3 is a flowchart illustrating a first portion of an automatic configuration process according to Embodiment 1 of the present invention.

Next, an automatic configuration process executed by the wireless LAN device AP1 will be described with reference to FIGS. 3 and 4. The automatic configuration process is a process of automatically configuring security information for wireless communication, based on the AOSS, for operation in the wireless LAN system 20. The security information is thus provided in the wireless LAN device AP1 having the access point function and the station function, and the access point AP2, or in the wireless LAN device AP1 and the station STA, which STA is wirelessly connected to the wireless LAN device AP1. The automatic configuration process based on the AOSS is executed, using an asymmetric protocol, between an access point and a station each having received the AOSS operation instruction. In the wireless LAN device AP1, the CPU 30 serves as the execution section 34 to execute the automatic configuration process. Hereinafter, the process based on the AOSS is also referred to as simple configuration.

In order to make the description which follows more clear, an outline of a simple configuration according to a related technique will first be described.

(1) When a station receives a simple configuration operation instruction, the station starts simple configuration. Then, the station searches for an access point, establishes a connection with a detected access point, and transmits an initialization packet IP to the access point.

(2) When the access point receives a simple configuration operation instruction, the access point starts simple configuration. Then, the access point goes into a standby mode in which it waits for the initialization packet IP. When the access point receives the initialization packet IP, the access point transmits an initialization response packet IRP to the station.

(3) The station receives the initialization response packet IRP, and transmits a configuration packet CP to the access point.

(4) The access point receives the configuration packet CP, and transmits a configuration response packet CRP including security information to the station.

(5) The station receives the configuration response packet CRP, and configures the security information included in the configuration response packet CRP.

Reference to the above-described conventional technique, the automatic configuration process according to Embodiment 1 will be described. In the wireless LAN device AP1, the automatic configuration process is started when a user pushes down the switch 53. When the automatic configuration process is started, as shown in FIG. 3, the CPU 30 serves as the reception section 33, and detects the push-down of the switch 53 to receive an automatic configuration instruction from the user (step S110). In Embodiment 1, since the wireless LAN device AP1 has only one switch 53, the CPU 30 receives, collectively, the automatic configuration instruction for both the wireless access point interface 61 and the wireless station interface 62. On receipt of the automatic configuration instruction, the CPU 30 starts simple configuration of the wireless access point interface 61 (step S120).

As an access-point-side operation for simple configuration, the CPU 30, which controls the wireless access point interface 61, goes into a standby mode in which it waits for an initialization packet IP transmitted from the station STA, which is a station for receiving an AOSS operation instruction (step S130). The initialization packet IP will be described in detail later.

While waiting for the initialization packet IP, the CPU 30 registers in the wireless station interface 62 the MAC address MAC1 of the wireless access point interface 61, which is an access-point-side interface in the wireless communication interface 60 (step S140). In this embodiment, the CPU 30 reads a specified area of the flash ROM 40 that is used by the wireless access point interface 61 to obtain the MAC1, and registers the MAC1 on a specified area of the RAM 52 that is used by the wireless station interface 62. After the registration of the MAC1, the CPU 30 starts simple configuration of the wireless station interface 62 (step S150).

As a station-side operation for simple configuration, the CPU 30, which controls the wireless station interface 62, transmits a probe request to search for an access point, and establishes a connection in infrastructure mode with an access point that returns a probe response in response to the probe request (step S160). In Embodiment 1, the CPU 30 serves as the exclusion section 35 to exclude the wireless access point interface 61 from the connection targets. In other words, the CPU 30 excludes the MAC1 registered in step S140 from the destinations of the probe request. Based on the above-described network construction of the wireless LAN system 20, since the wireless access point interface 61 is excluded from the connection targets, the CPU 30 establishes a connection with the access point AP2. If a plurality of access points, other than the excluded wireless access point interface 61, are detected, the CPU 30 may establish a connection with, for example, the access point having the strongest RSSI (Received Signal Strength Indication) among the access points excluding the wireless access point interface 61.

After the establishment of the connection to the access point AP2, the CPU 30, as a station-side operation for simple configuration, broadcasts an initialization packet IP (step S170). Since the CPU 30, which controls the wireless station interface 62, did not establish a connection with the wireless access point interface 61 in step S160, the initialization packet IP is not received by the wireless access point interface 61.

Figure 4:
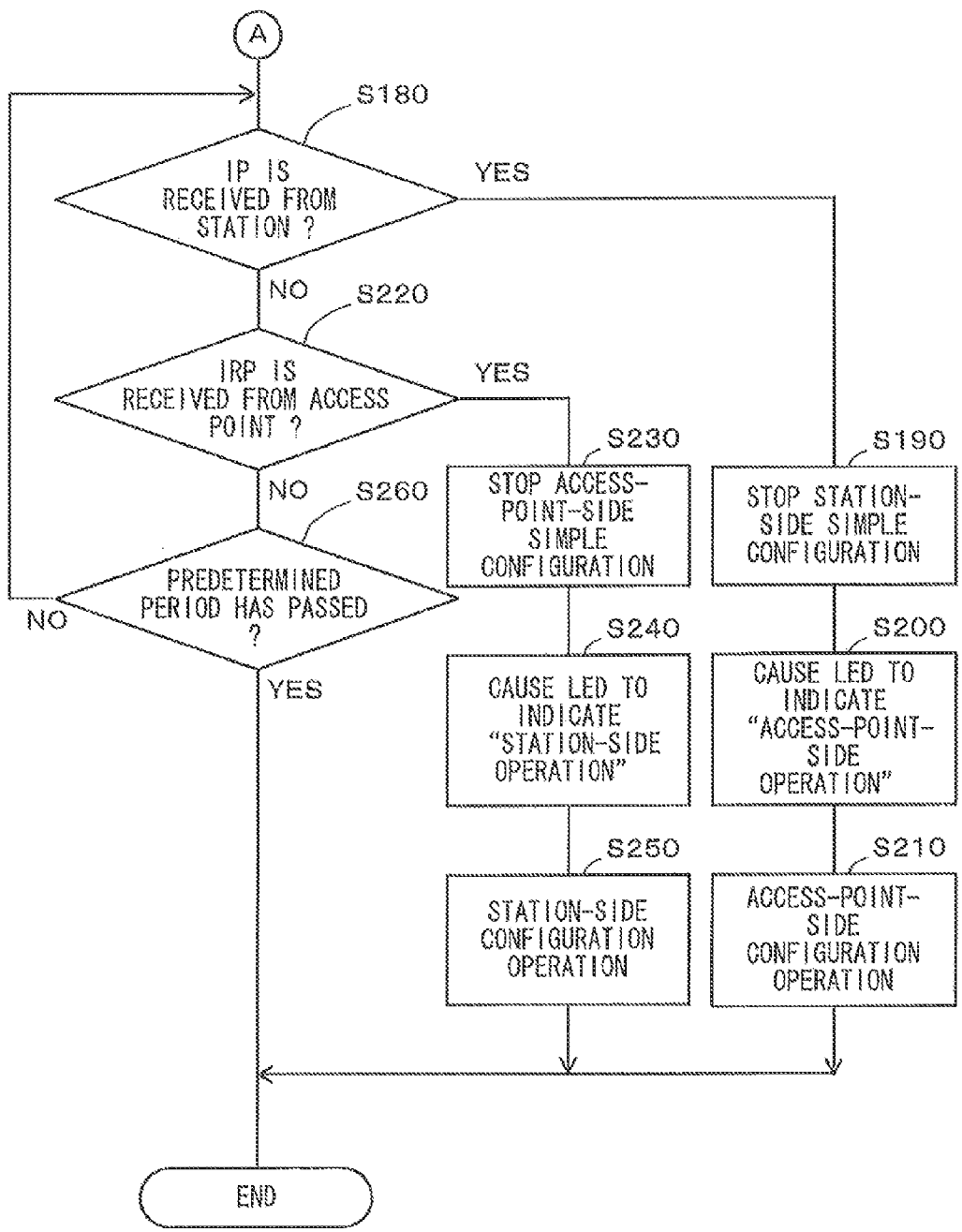
FIG. 4 is a flowchart illustrating a second portion of the automatic configuration process according to Embodiment 1 of the present invention.

After the broadcasting of the initialization packet IP, as shown in FIG. 4, the CPU 30 determines whether an initialization packet IP has been received from a station (in this case, for example, the station STA which has received the AOSS operation instruction) via the wireless access point interface 61 (step S180). Since, in step S170, the CPU 30 transmitted the initialization packet IP to the destinations other than the wireless access point interface 61 excluded from the destinations of the initialization packet IP, it is assured that the initialization packet IP (in step S170) is not received by the wireless access point interface 61. Accordingly, when an initialization packet IP (in step 180) is received from a station other than from the station of the wireless LAN device AP1, and to which the AOSS operation instruction was made, the CPU 30 determines that the initialization packet IP is received. In this embodiment, the station is the station STA, based on the network construction of the wireless LAN system 20.

If the CPU 30 determines that an initialization packet IP is received from the station STA (YES in step S180), the CPU 30 performs the access-point-side simple configuration process. The CPU 30 serves as the stoppage section 37 to stop the simple configuration operation of the wireless station interface 62 started in step S150 (step S190). Thus, the operation of the wireless station interface 62, which in this embodiment is not used for the subsequent access-point-side simple configuration process, is stopped. Therefore, radio wave interface between the access-point-side simple configuration process and the operation of the wireless station interface 62 is removed. In addition, power consumption is reduced, thereby contributing to resource saving.

After the stopping of the simple configuration operation of the wireless station interface 62, the CPU 30 serves as the information section 36 to blink the LED 54 with a color indicating that the access-point-side simple configuration operation is being performed (step S200). Thus, the user can know that the simple configuration is being executed in the wireless access point interface 61. As a result, if an abnormality occurs in the simple configuration operation, the user can understand that the abnormality occurs in the access-point-side simple configuration process.

The initialization packet IP transmitted from the station STA includes, in addition to data indicating that security configuration is required, information relating to an encryption key which is temporarily used for encrypted communication until the security configuration is completed. The CPU 30 generates an initialization response packet IRP in response to the initialization packet IP, and transmits the initialization response packet IRP to the station STA. The initialization response packet IRP includes the IP address of the wireless LAN device AP1. The station STA, having received the initialization response packet IRP, cap perform wireless communication with the wireless LAN device AP1 by designating the IP address of the wireless LAN device AP1 as a destination IP address.

With a configuration packet CP received from the station STA as a trigger, the CPU 30 executes a process of transmitting a configuration response packet CRP including security information, thereby completing the access-point-side simple configuration (step S210). In Embodiment 1, the security information is newly generated. However, in a case where the wireless LAN device AP1 is newly added to the already-constructed wireless LAN, existing security information for the wireless LAN may be used. With the completion of the access-point-side simple configuration, the automatic configuration process is ended.

On the other hand, if the CPU 30 determines that an initialization packet IP is not received from the station STA (NO in step S180), the CPU 30 determines whether an initialization response packet IRP is received as a response to the initialization packet IP transmitted in step S170, from the access point (in this case, the access point AP2 to which the AOSS operation instruction was made) via the wireless station interface 62 (step S220). Since, in step S170, the CPU 30 transmitted the initialization packet IP to the destinations other than the wireless access point interface 61 excluded from the destinations of the initialization packet IP, it is assured that the initialization response packet IRP (in step S220) as a response to the initialization packet IP is not received from the wireless access point interface 61. Therefore, when an initialization response packet IRP (in step S220) is received from an access point other than from the access point of the wireless LAN device AP1, and to which the AOSS operation instruction was made, the CPU 30 determines that the initialization response packet IRP is received. In this embodiment, the access point is the access point AP2, based on the network construction of the wireless LAN system 20.

If the CPU 30 determines that an initialization response packet IRP is received from the access point AP2 (YES in step S220), the CPU 30 performs the station-side simple configuration process. The CPU 30 serves as the stoppage section 37 to stop the simple configuration operation of the wireless access point interface 61 started in step S120 (step S230). Then, the CPU 30 serves as the information section 36 to blink the LED 54 with a color indicating that the station-side simple configuration operation is being performed (step S240). Thus, the operation of the wireless station interface 61, which in this embodiment is not used for the subsequent station-side simple configuration process, is stopped. Therefore, radio wave interface between the station-side simple configuration process and the operation of the wireless station interface 61 is removed. In addition, power consumption is reduced, thereby contributing to resource saving. Moreover, the user can know that the simple configuration is being executed in the wireless station interface 62. As a result, if an abnormality occurs in the simple configuration operation, the user can understand that the abnormality occurs in the station-side simple configuration process.

The CPU 30 performs, in response to the initialization response packet IRP received from the access point AP2, a process of storing and configuring the security information included in the initialization response packet IRP, thereby completing the station-side simple configuration (step S250).

With the completion of the station-side simple configuration, the automatic configuration process is ended. On the other hand, if an initialization response packet IRP is not received from the access point AP2 (NO in step S220), the CPU 30 repeats the processes of steps S180 to S250 until a predetermined period (for example, two minutes) has passed (step S260). When the predetermined period has passed (YES in step S260), the CPU 30 ends the automatic configuration process.

In this embodiment, among the above-described steps in the automatic configuration process, steps S110 to S130, S150, S160 (excluding the point that the wireless access point interface 61 is excluded from the destinations of the connection request), S170, S210, S220, S250 and S260 are compliant with the conventional AOSS. In Embodiment 1, among these steps, the CPU 30 executes, as the first communication section 31, the steps for the access-point-side communication via the wireless access point interface 61, and executes, as the second communication section 32, the steps for the station-side communication via the wireless access point interface 62.

In the wireless LAN device AP1 thus constructed, when either the wireless access point interface 61 or the wireless station interface 62 performs the AOSS operation in accordance with the execution instruction, the other interface is excluded before completion of the operation. Therefore, the AOSS operation of the wireless station interface 62 is prevented from being completed before the AOSS operation of the wireless access point interface 61 is completed, or the AOSS operation of the wireless access point interface 61 is prevented from being completed before the AOSS operation of the wireless station interface 62 is completed, with no need to specify which of the wireless access point interface 61 and the wireless station interface 62 should be operated. As a result, in the wireless LAN device AP1 constructed such that only either of the wireless access point interface 61 or the wireless station interface 62 is operated, it is not necessary to provide two switches 53 corresponding to the wireless access point interface 61 and the wireless station interface 62, respectively, resulting in a simple device construction. Furthermore, when giving an AOSS operation instruction, the user need not set, using an UI (User Interface), which of the wireless access point interface 61 and the wireless station interface 62 should be operated, resulting in a simple user operation.

In the wireless LAN device AP1, the MAC address MAC1 of the wireless access point interface 61 is registered in the wireless station interface 62. The wireless access point interface 61, which has the MAC address MAC1, is excluded from the destinations of the probe request to partially restrict the AOSS operation of the wireless access point interface 61 and the wireless access point interface 62, thereby preventing completion of the AOSS operation performed by the participation of the wireless access point interface 61 and the wireless station interface 62 in cooperation. Accordingly, it is not necessary to perform complicated exclusive control of the wireless access point interface 61 and the wireless station interface 62, thereby realizing high-speed AOSS operation.

Embodiment 2

Figure 5:
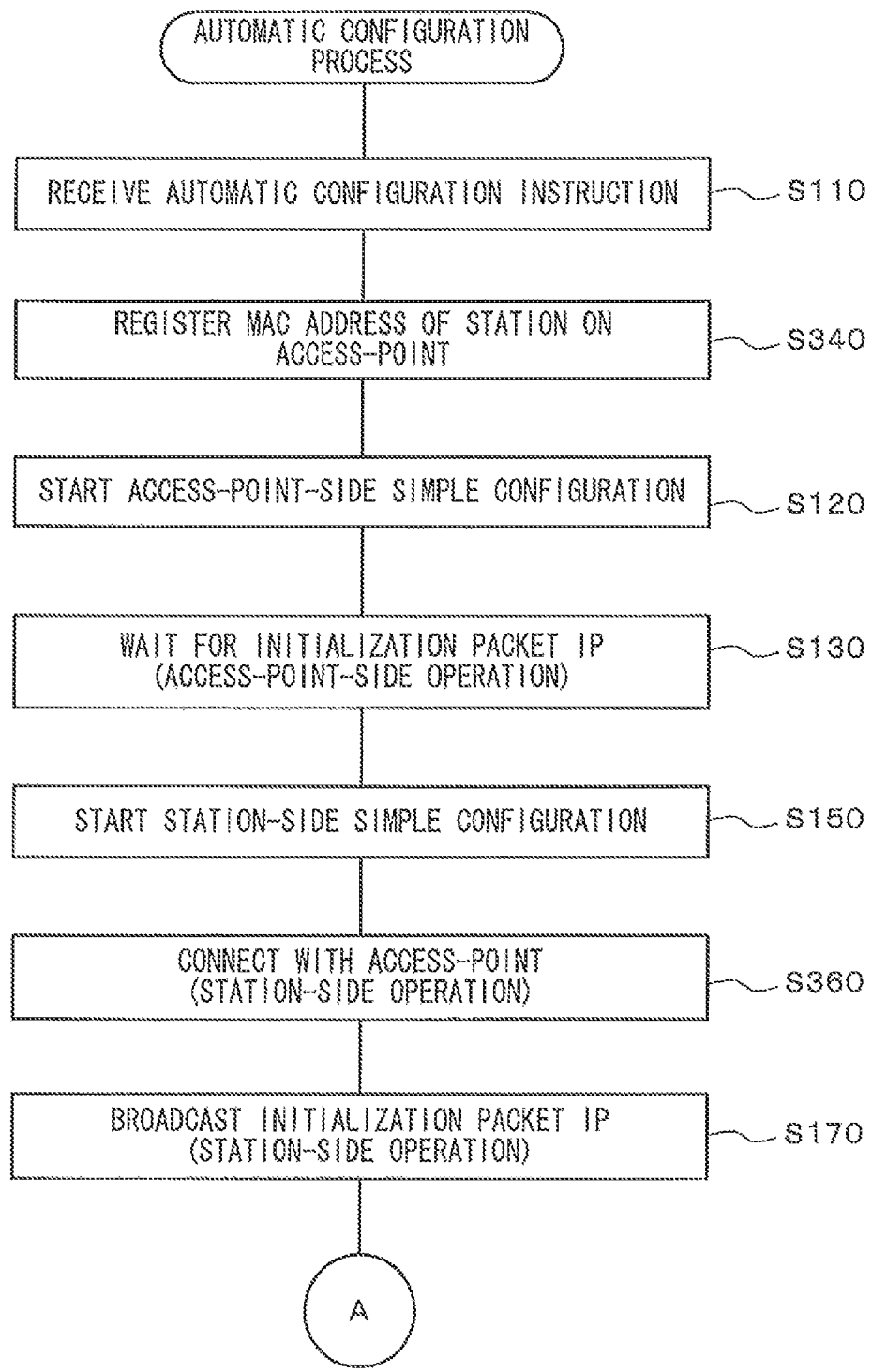
FIG. 5 is a flowchart illustrating a first portion of an automatic configuration process according to Embodiment 2 of the present invention.
Figure 6:
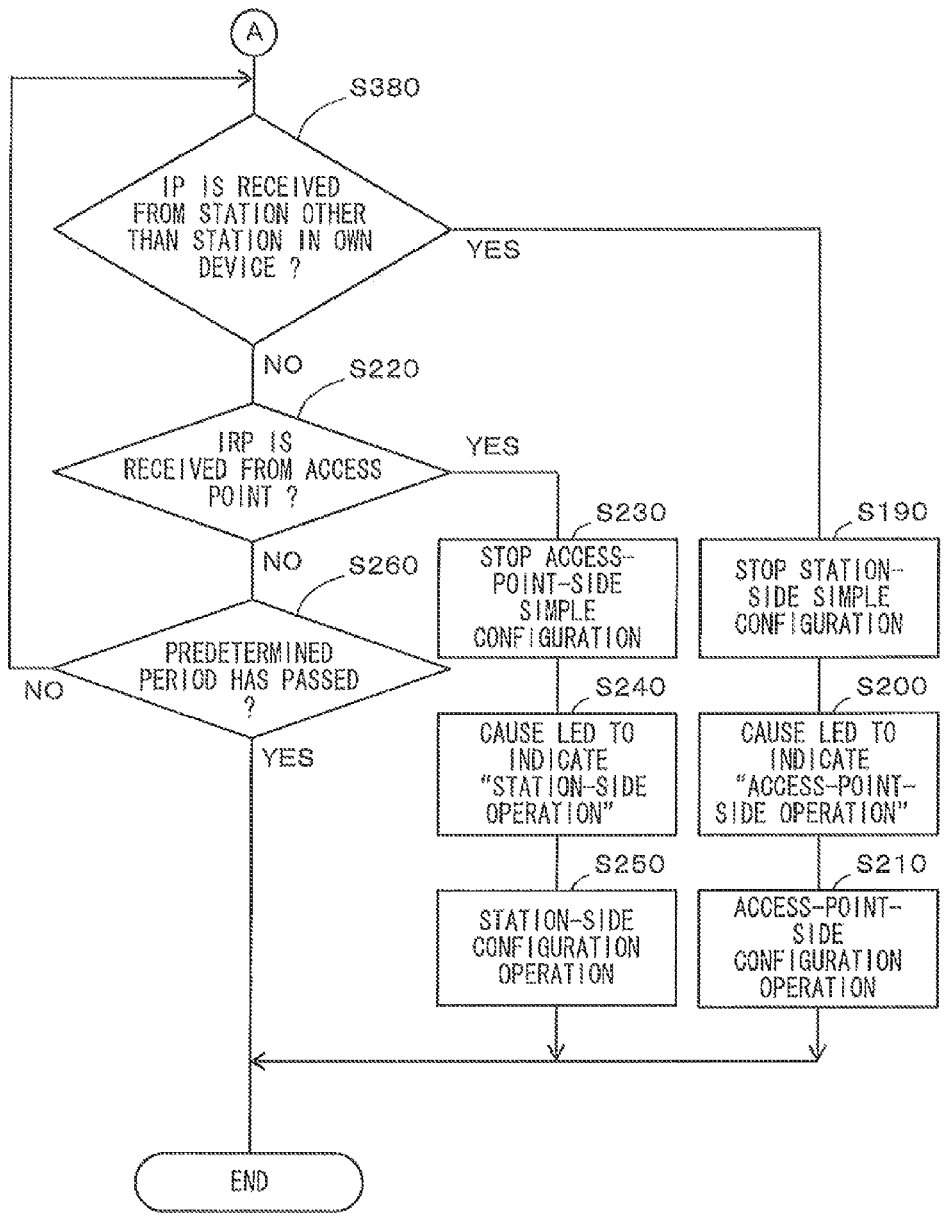
FIG. 6 is a flowchart illustrating a second portion of the automatic configuration process according to Embodiment 2 of the present invention.

Embodiment 2 of the present invention will now be described. The construction of the wireless LAN device AP1 according to Embodiment 2 is identical to that of Embodiment 1, and the flow of the automatic configuration process differs. Hereinafter, the automatic configuration process according to Embodiment 2 will be described with reference to FIGS. 5 and 6. In FIGS. 5 and 6, the process steps identical to those of Embodiment 1 are given the same reference numerals as those in FIGS. 3 and 4 without adding explanations. The different points from Embodiment 1 will be described below.

When the automatic configuration process is started, as shown in FIG. 5, the CPU 30 receives an automatic configuration instruction (step S110), and registers in the wireless access point interface 61 the MAC address MAC2 of the wireless station interface 62, which is a station-side interface in the wireless communication interface 60 (step S340). In this embodiment, the CPU 30 reads a specified area of the flash ROM 40 that is used by the wireless station interface 62 to obtain the MAC2, and registers the MAC2 on a specified area of the RAM 52 that is used by the wireless access point interface 61. After the registration of the MAC2, the CPU 30 performs the processes of steps S120, S130, S340, and S150 as described for Embodiment 1. Then, the CPU 30, as a station-side operation for simple configuration, transmits a probe request to search for an access point, and establishes a connection in infrastructure mode with an access point that returns a probe response in response to the probe request (step S360). In step S360, in contrast to Embodiment 1, the CPU 30 does not exclude the wireless access point interface 61 from the connection targets. Accordingly, based on the above-described network construction of the wireless LAN system 20, the CPU 30 establishes connection with the access point AP2 via the wireless access point interface 61.

After the establishment of the connection to the access point AP2 as the access point, the CPU 30 broadcasts an initialization packet IP (step S170). Then, as shown in FIG. 6, the CPU 30 determines whether an initialization packet IP has been received from a station having a MAC address other than the MAC2 registered in step S340 (step S380). That is, the CPU 30 determines whether an initialization packet IP (in step S380) has been received from a station other than the wireless station interface 62 of the wireless LAN device AP1. When an initialization packet IP (in step S380) is received from a station other than from the station of the wireless LAN device AP1, and to which the AOSS operation instruction was made, the CPU 30 determines that the initialization packet IP is received. In this embodiment, the station is the station STA, based on the above-described network construction Of the wireless LAN system 20.

If the CPU 30 determines that an initialization packet IP is received from the station, i.e., the station STA (YES in step S380), the CPU 30 performs the processes of steps S190 to S210 as in Embodiment 1. On the other hand, if the CPU 30 determines that an initialization packet IP is not received from the station (NO in step S380), the CPU 30 performs the processes of steps S220 to S260 as in Embodiment 1.

In Embodiment 2, the MAC address MAC2 of the wireless station interface 62 is registered in the wireless access point interface 61. Also in this case, the same effect as achieved in Embodiment 1 can be achieved. In Embodiment 1, however, since an initialization packet IP is not transmitted from a station (steps S160 and S170), the communication load of the wireless LAN can be reduced. Embodiment 1 and Embodiment 2 may be combined such that the MAC address MAC1 of the wireless access point interface 61 is registered in the wireless station interface 62 while the MAC address MAC2 of the wireless access point interface 62 is registered in the wireless station interface 61.

Modifications

Hereinafter, modifications of the above-described embodiments will be described. The order of the process steps in the automatic configuration process according to each of the above-described embodiments is merely an example. The process steps in the automatic configuration process may be performed in any order as long as completion of the simple configuration operation, which is performed by the participation of the wireless access point interface 61 and the wireless station interface 62 in cooperation, is prevented. For example, simple configuration of the wireless access point interface 61 may be started after simple configuration of the wireless station interface 62 is started. Alternatively, the order of the determination steps S180 and S220 in Embodiment 1 may be reversed.

In Embodiment 1, the access point (the wireless access point interface 61) having the MAC1 registered in step S140 is excluded from the connection targets, thereby preventing completion of the simple configuration operation which is performed by the participation of the wireless access point interface 61 and the wireless station interface 62 in cooperation. A connection is established with another access point (step S160). However, the present invention is not restricted thereto. For example, whether an initialization response packet IRP is received may be determined, with excluding, in step S220, an initialization response packet IRP received from the wireless access point interface 61 having the registered MAC1, without excluding the wireless access point interface 61 in step S160. This configuration may be combined with the configuration of Embodiment 1.

In the above-described embodiments, the wireless LAN device AP1, which is provided with the switch 53, detects that the user presses down the switch 53, and thereby receives an AOSS operation startup instruction by the user. However, the manner of receiving the startup instruction is not restricted thereto. For example, the wireless LAN device AP1 may receive, by using a remote controller or the like, a startup instruction issued by infrared communication or Bluetooth (trademark). Alternatively, the wireless LAN device AP1 may receive a startup instruction issued by using a WEB browser or the like, from a computer, via a wired LAN connected to the wireless LAN device AP1. Alternatively, the wireless LAN device AP1 may internally receive a startup instruction issued by the CPU 30 in the wireless LAN device AP1, according to a predetermined rule, for example, with an occurrence of a predetermined event as a trigger.

In the above-described embodiments, the process of the wireless access point interface 61 and the process of the wireless station interface 62 are executed in parallel with each other, according to a single instruction to start AOSS operation. However, the present invention is not restricted thereto. The AOSS may be realized by exclusively and sequentially operating the wireless access point interface 61 and the wireless station interface 62. For example, when an instruction to start AOSS operation is received, firstly simple configuration is started for the wireless station interface 62 alone. If an access point is not found or if an initialization response packet IRP is not received from an access point within a predetermined period, the simple configuration of the wireless station interface 62 is stopped. Thereafter, simple configuration for the wireless access point interface 61 is started. Also in this case, completion of the AOSS operation, which is performed by the participation of the wireless access point interface 61 and the wireless station interface 62 in cooperation, is prevented, with no need to specify which one of the wireless access point interface 61 and the wireless station interface 62 should be operated.

In the above-described embodiments, an automatic configuration process for security information compliant with the AOSS is described as an example of an asymmetric protocol executed between the wireless LAN device AP1 and an access point or a station other than the wireless LAN device AP1. However, such an asymmetric protocol is not restricted to a process compliant with the AOSS, but is applicable to: a process of automatically configuring wireless connection information for encryption, authentication, or the like of network equipment by using WPS or the like; and a process of exchanging a dynamic encryption key by using WPA (Wi-Fi Protected Access), WPA2, or the like. The protocol, used in the present invention, need not be determined based on an access point-station relationship of the units but may be determined based on the ranks of the units. For example, a protocol may be determined based on two access points having the same rank or two stations having the same rank.

While the embodiments of the present invention have been described, it should be understood that, among the constituents in the embodiments, the constituents other than those described in independent claims are additional constituents that can be appropriately omitted or combined. It is apparent that the present invention is not restricted to the embodiments, but the invention can be executed in various modes without departing from the technical range thereof. For example, the present invention can be implemented not only as a wireless LAN device but also as a protocol execution method, a program thereof, and a recording medium having the program stored therein.

While the invention has been described in detail, the foregoing description is in all aspects illustrative and not restrictive. It will be understood that numerous other modifications and variations can be devised without departing from the scope of the invention.

What is claimed is:

1. A wireless LAN device for performing wireless communication with another wireless device in a wireless communication system, the wireless LAN device comprising:
    a wireless access point interface which functions as an access point, and which performs wireless communication as the access point participating in a configuration process using a predetermined protocol;
    a wireless station interface which functions as a station, and which performs wireless communication as the station participating in the configuration process;
    a reception section which receives an instruction for the wireless access point interface and the wireless station interface to execute the configuration process;
    an execution section which executes, based on the instruction received by the reception section, the configuration process by use of one of the wireless access point interface and the wireless station interface in cooperation with the another wireless device; and
    an exclusion section which performs, before the configuration process is completed, an exclusion process that excludes the other of the wireless access point interface and the wireless station interface from continuing to participate in the configuration process.

2. The wireless LAN device according to claim 1, wherein the exclusion section restricts wireless communication between the wireless access point interface and the wireless station interface, based on identification information of at least one of the wireless access point interface and the wireless station interface, thereby performing the exclusion process.

3. The wireless LAN device according to claim 1, wherein the configuration process includes a process for configuring security information from one to the other of the wireless access point interface and the wireless station interface by the wireless communication, the security information relating to the wireless communication and being used by the wireless access point interface and the wireless station interface.

4. The wireless LAN device according to claim 1, further comprising:
    an information section for informing which one of the wireless access point interface and the wireless station interface is executing the configuration process.

5. The wireless LAN device according to claim 1, further comprising:
    a stoppage section for stopping an operation of the wireless access point interface or the wireless station interface which is excluded by the exclusion section, at least until the configuration process is completed.

6. The wireless LAN device according to claim 1, wherein the configuration process includes AOSS operations.

7. A wireless communication system, comprising:
    the wireless LAN device according to claim 1, and the another wireless LAN device.

8. A protocol execution method to be executed by a a wireless LAN device comprising
    a wireless access point interface which functions as an access point, and which performs wireless communication as the access point participating in a configuration process using a predetermined protocol, and a wireless station interface which functions as a station, and which performs wireless communication as the station participating in the configuration process, the method comprising:

receiving an instruction for both the wireless access point interface and the wireless station interface to execute the configuration process using the predetermined protocol;

executing the configuration process, based on the instruction, using one of the wireless access point interface and the wireless station interface in cooperation with another wireless device which is located in a radio coverage area of the wireless LAN device, and is capable of performing wireless communication with the wireless LAN device; and excluding, before the configuration process is completed, the other of the wireless access point interface and the wireless station interface from continuing to participate in the configuration process.

9. A computer-readable non-transitory storage medium having stored therein a program that causes a processor of a wireless LAN device which performs wireless communication to execute a procedure comprising the steps of:

receiving an instruction for both a wireless access point interface and a wireless station interface to execute a configuration process using a predetermined protocol;

executing the configuration process, based on the instruction, using one of the wireless access point interface and the wireless station interface in cooperation with another wireless device which is located in a radio coverage area of the wireless LAN device, and is capable of performing wireless communication with the wireless LAN device; and excluding, before the configuration process is completed, the other of the wireless access point interface and the wireless station interface from continuing to participate in the configuration process.

* * * * *